United States Patent
Neuhof et al.

(10) Patent No.: US 6,695,265 B2
(45) Date of Patent: Feb. 24, 2004

(54) LUG SYSTEM

(75) Inventors: Markus Neuhof, Ehringshausen-Niederlemp (DE); Thomas Schreiner, Breitscheid (DE); Matthias Müller, Haiger (DE); Heinz Schmitt, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/221,895

(22) PCT Filed: Feb. 7, 2001

(86) PCT No.: PCT/EP01/01296
§ 371 (c)(1),
(2), (4) Date: Sep. 17, 2002

(87) PCT Pub. No.: WO01/69122
PCT Pub. Date: Sep. 20, 2001

(65) Prior Publication Data
US 2003/0047657 A1 Mar. 13, 2003

(30) Foreign Application Priority Data
Mar. 17, 2000 (DE) .......................... 100 13 283

(51) Int. Cl.$^7$ ................................................ F16L 5/00
(52) U.S. Cl. ............................ 248/56; 248/317; 40/617
(58) Field of Search .................. 248/610, 56, 589, 248/317, 341; 40/570, 617, 606.15

(56) References Cited

U.S. PATENT DOCUMENTS 2,347,113 A * 4/1944 King ........................... 248/62
3,168,252 A * 2/1965 Cabernoch ................... 362/404
3,731,760 A * 5/1973 Hammes ...................... 181/199
3,736,417 A * 5/1973 Williams ..................... 362/430
4,993,676 A * 2/1991 Fitts et al. ................... 248/317
5,009,384 A * 4/1991 Gerke et al. ................. 248/343
5,487,524 A * 1/1996 Bergetz ....................... 248/613
5,797,568 A * 8/1998 Canton Gongora et al. ..... 248/122.1
5,937,073 A * 8/1999 Van Gieson ................. 381/391
6,036,154 A * 3/2000 Pearce ........................ 248/343
6,175,487 B1 * 1/2001 McCartney et al. ......... 361/674

FOREIGN PATENT DOCUMENTS

DE       40 33 747 A1 *  4/1992
DE      195 01 027 A1 *  7/1996
DE      198 03 570 C1 *  3/1999

* cited by examiner

Primary Examiner—Leslie A. Braun
Assistant Examiner—Kofi Schulterbrandt
(74) Attorney, Agent, or Firm—Pauley Petersen & Erickson

(57) ABSTRACT

A lug system having a lug and a receiving housing. A turning knuckle is joined to the receiving housing by an adapter. The lug, the turning knuckle and the adapter form a cable channel which opens into the inner chamber of the receiving housing. The adapter is connected to the receiving housing in a stable manner. The receiving housing has a housing frame composed of frame profiles. The housing frame is closed or can be closed on the backside by a separate back wall. The adapter is connected to at least one of the frame profiles and has a connected section for the turning knuckle. The connected section protrudes over the frame profile on the backside.

17 Claims, 3 Drawing Sheets

LUG SYSTEM

BACKGROUND OF THE INVENTION

1. Field of the Invention

This invention relates to a supporting arm system with a supporting arm and a receiving housing, in which a pivot joint is connected to the receiving housing by an adapter and in which the supporting arm, the pivot joint, and the adapter form a cable conduit which opens into the interior of the receiving housing.

2. Discussion of Related Art

German Patent Reference DE 40 33 747 C2 discloses a supporting arm system of this kind. The supporting arm system has a supporting arm, which is coupled to a receiving housing by a pivot joint embodied as a mounting joint. The receiving housing can be embodied as a control housing or a display housing. The pivot joint is coupled to the horizontal top of the housing by an adapter. The attachment is produced by screw connections. Accordingly, fastening screws are inserted through an opening in the top of the receiving housing, slid through the adapter, and screwed into the pivot joint.

In a device of this kind, the top of the housing must be large enough to permit attachment of the pivot joint. The top of the housing is embodied as a thin-walled sheet metal plate. If heavy components are affixed on the interior of the receiving housing, then a stable attachment of pivot joint requires additional reinforcing features to prevent the screw connection between the top of the housing and the pivot joint from being torn out.

SUMMARY OF THE INVENTION

An object of this invention is to provide a supporting arm system of the type mentioned above but in which it is possible to produce a stable attachment of the pivot joint even when the depth measurement of the receiving housing is small.

This object is achieved with a receiving housing that has a housing frame comprised of frame profiles, which is closed or can be closed at the back by a separate back wall, and where the adapter is attached to at least one of the frame profiles and has a connecting section for the pivot joint, which connecting section protrudes beyond the frame profile at the back.

The receiving housing is laterally defined by a housing frame, which is comprised of frame profiles and thus forms a rigid and stable unit. The pivot joint can be connected directly to this unit by the adapter. The adapter itself forms a connecting section, which protrudes beyond the receiving housing at the back and to which the pivot joint is connected. As a result, the dimensions of the receiving housing can be freely selected independent of the embodiment of the pivot joint. In particular, very flat receiving housings can also be produced, which are used, for example, to contain flat screens.

The visual appearance of the housing frame is not impaired if the connecting section of the adapter has a mounting surface to which the pivot joint is coupled and the mounting surface is positioned parallel to the associated side of the housing and adjoins the coupled frame profile.

This is particularly advantageous if the housing frame is embodied as a design element. The mounting surface disposed parallel to the housing side permits the supporting arm to be coupled so that it is positioned with its longitudinal span at right angles to this associated profile side.

In this connection, it is possible for the mounting surface of the adapter to be disposed in a plane with a profile side of the frame profile positioned parallel to the associated housing side.

In order to permit an organized routing of cables through the adapter, with this invention the adapter has a housing in which the cable conduit is accommodated. The cable conduit is spatially connected to the interior of the receiving housing by a first cable feedthrough and is spatially connected to a cable conduit formed by the supporting arm by a second cable feedthrough. The second cable feedthrough is accommodated in the connecting section of the adapter protruding from the back of the housing, and in the region between the two cable feedthroughs the housing of the adapter has an inspection opening which opens into the cable conduit of the adapter and can be closed with a cover.

The inspection opening makes it easier to slide cable through the cable conduit when the two cable feedthroughs are positioned at an angle to each other.

In one embodiment, the receiving housing is selected so that the adapter protrudes with a projection into the open back of the receiving housing. The cable conduit of the adapter feeds through the projection into the receiving housing. The projection has a sealing section which transitions into a sealing section of the housing frame. A back wall covering the back of the housing is attached to housing frame, and the back wall is supported against a seal positioned between the sealing sections and the back wall.

In one embodiment the back wall has a cutout which is open toward one side of the back wall and the edge of the cutout is supported by the seal against the sealing section of the projection, and thus the back wall in the receiving housing can be removed without need to manipulate the adapter.

The stable connection of the supporting arm to the receiving housing is improved because the adapter has a supporting piece, which protrudes into the interior of the receiving housing and rests against the inside of the associated frame profile, and the supporting piece is connected to the inside of the frame profile.

The supporting piece can be detachably fastened to the adapter. This allows a building block system to be produced, of which the adapter is a basic component. Variously embodied supporting pieces can be attached to the basic component. The supporting pieces are embodied to be adapted to different types of receiving housings.

The stable connection of the adapter to the receiving housing can also be accomplished so that the frame profiles of the housing frame have a fastening groove led into them, to which a back wall is fastened, which covers the open back of the receiving housing. The adapter is screwed to the housing frame by the fastening groove.

BRIEF DESCRIPTION OF THE DRAWINGS

This invention is explained in detail below in view of an exemplary embodiment shown in the drawings, wherein.

DESCRIPTION OF PREFERRED EMBODIMENTS

Figure 1:
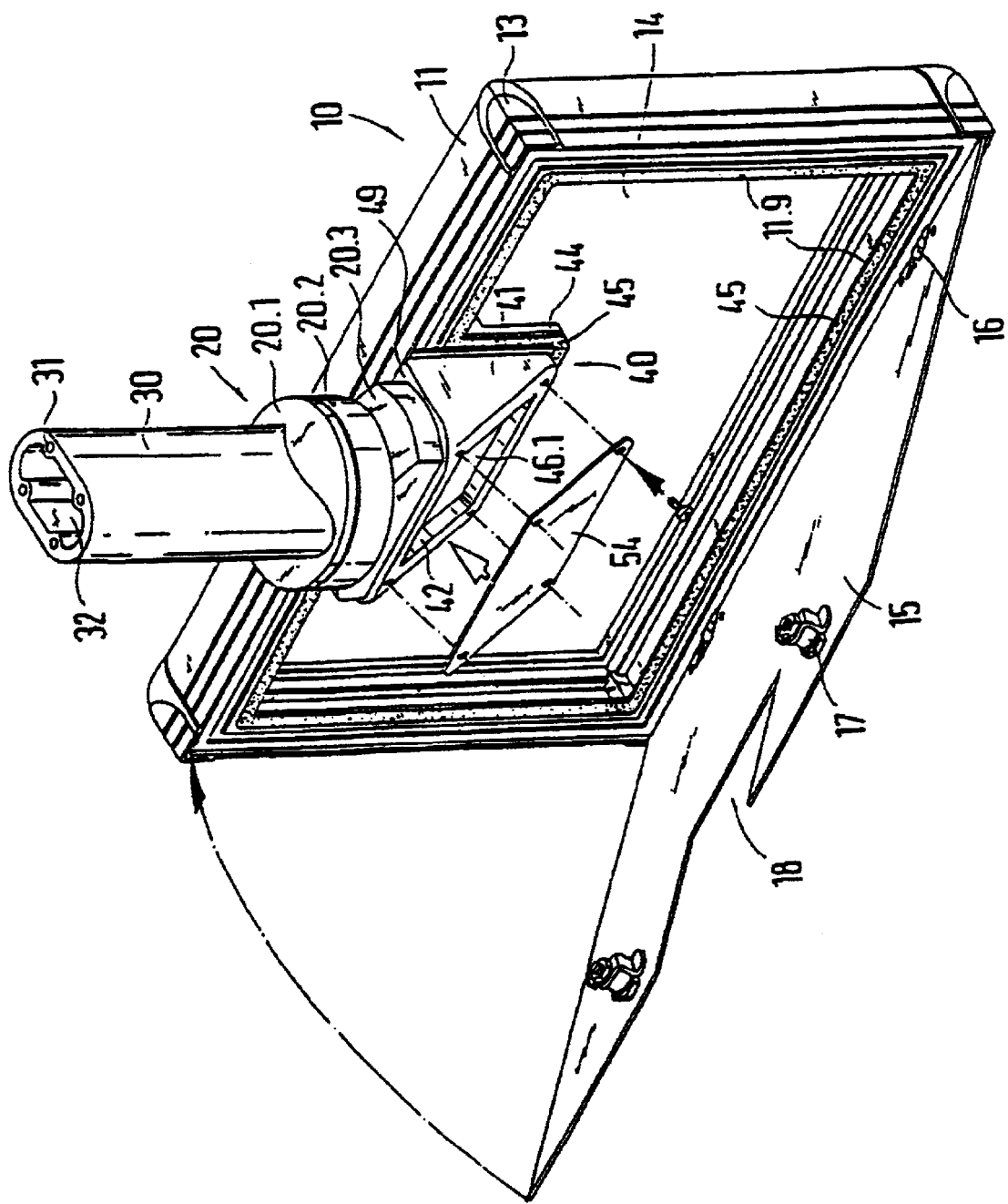
FIG. 1 shows a perspective rear view of a supporting arm system with a supporting arm, a pivot joint, and a receiving housing.

FIG. 1 shows the supporting arm 30, which is embodied as a hollow profile section. The supporting arm 30 is manufactured as an extruded profile and has screw channels 31 extending in the longitudinal direction of the profile. The supporting arm 30 encloses a cable conduit 32. At its lower end, the supporting arm 30 is coupled to a pivot joint 20. The pivot joint 20 has two joint parts 20.1 and 20.2. The two joint parts 20.1 and 20.2 can be rotated in relation to each other around a vertical rotation axis. The connection of the upper-joint part 20.1 to the supporting arm is by fastening screws, which are screwed into the screw channels 31 of the supporting arm 30. The second joint part 20.2 is connected to an adapter 40 by a coupling piece 20.3.

Figure 2:
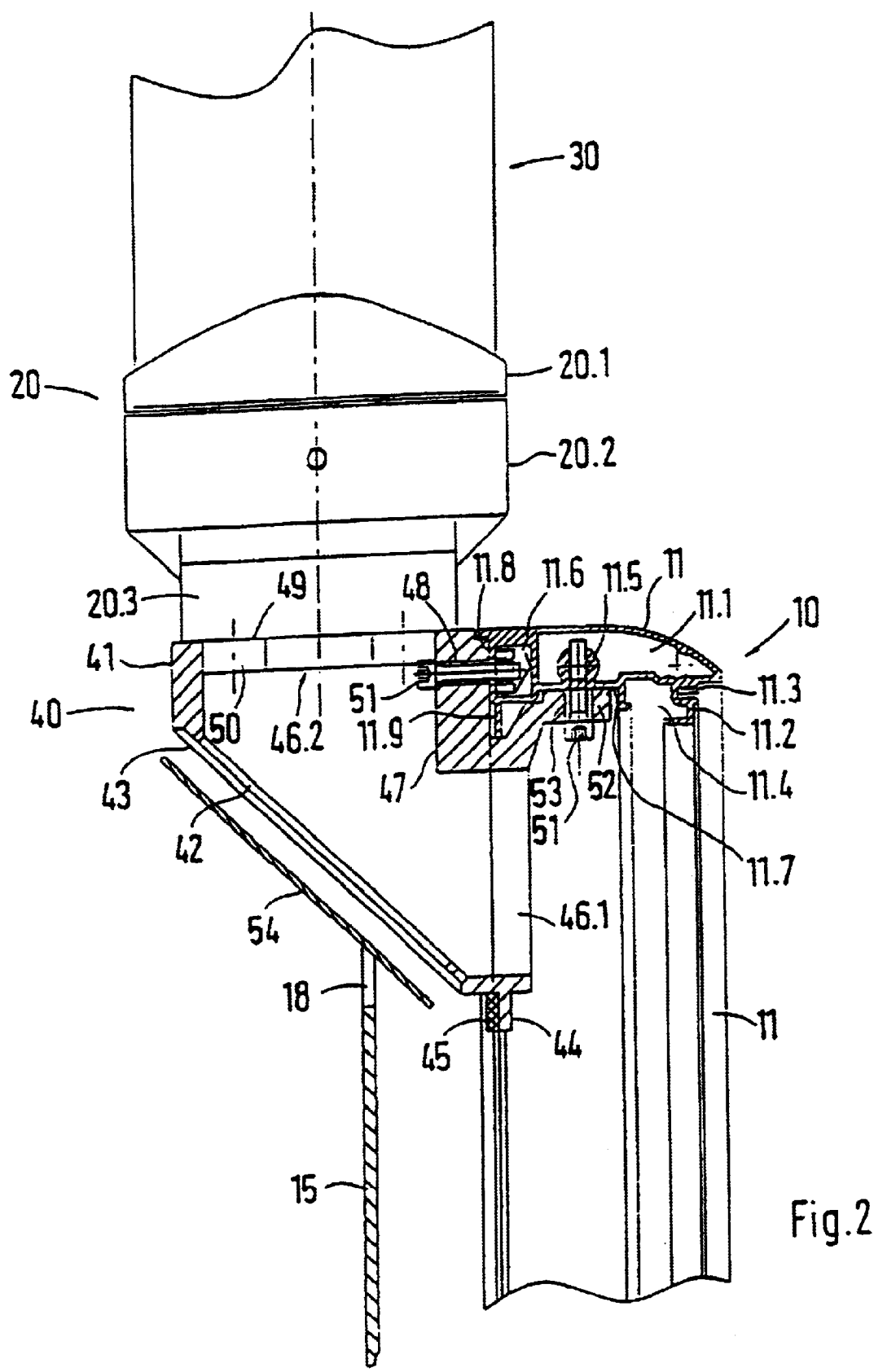
FIG. 2 shows a partial sectional side view of the supporting arm system shown in FIG. 1.
Figure 3:
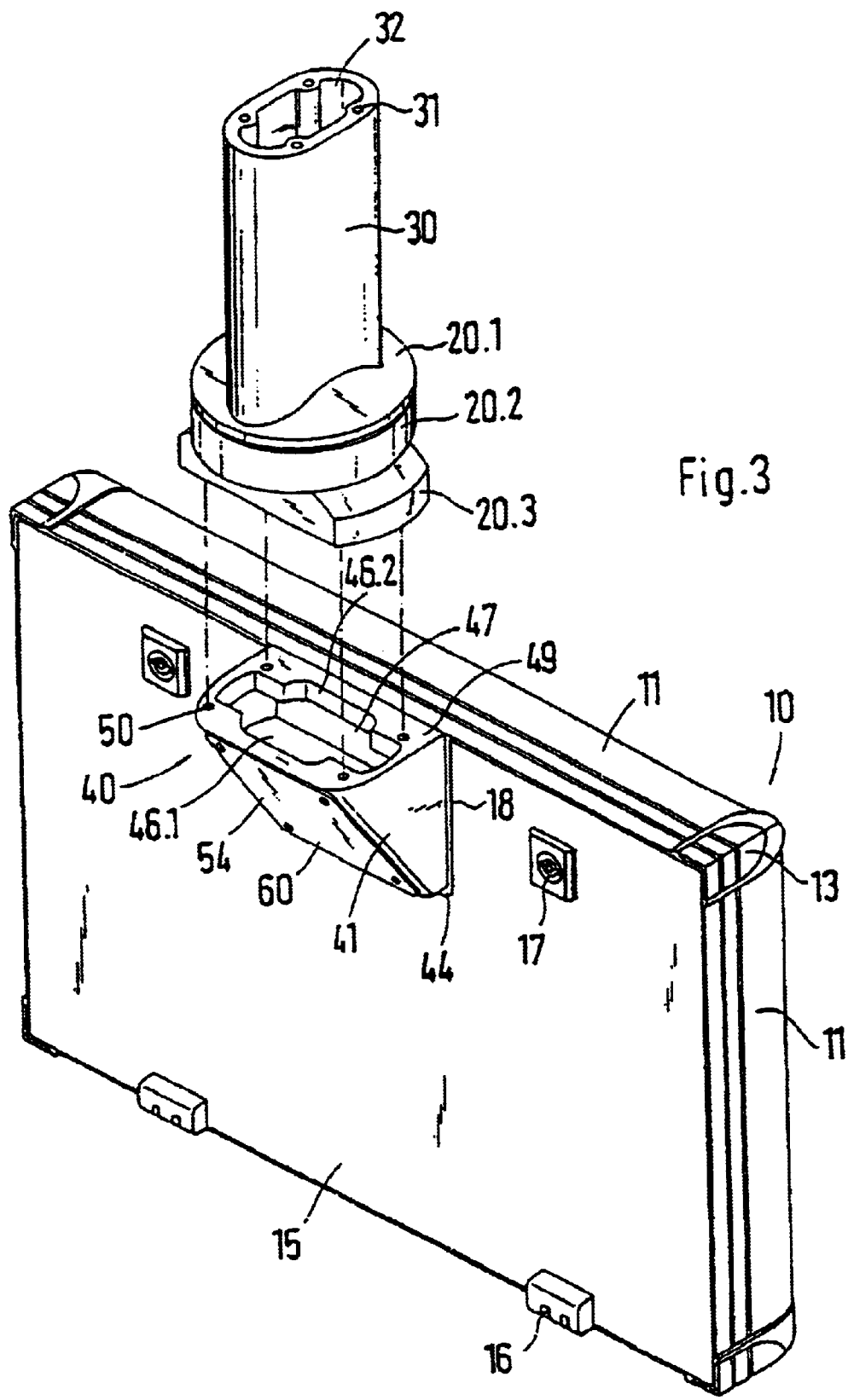
FIG. 3 shows a perspective view of the supporting arm system shown in FIG. 1, but with a closed back wall.

The detailed embodiment of the adapter 40 is shown more closely in FIG. 2. As shown in the drawing, the adapter 40 has a housing 41. This housing 41 has a cable conduit passing through it. The cable conduit is spatially connected to the cable conduit 32 of the supporting arm 30 by the pivot joint 20. Accordingly, cable coming from the supporting arm 30 can be inserted into the cable conduit of the adapter 40 through an upper cable feedthrough 46.2 and can be inserted into the interior of a receiving space through a second, lower cable feedthrough 46.1. The embodiment of the receiving housing is later explained in more detail.

The cable conduit can be accessed from the side by an inspection opening 42. This inspection opening 42 can be closed by a cover 54. A centering projection 43 is provided for aligning the cover 54 on the housing 41. As shown in FIG. 1, the cover 54 can be screwed to the adapter 40. A connecting section 49 is used to couple the pivot joint 20 to the adapter 40. The connecting section 49 forms a flat support surface onto which the coupling piece 20.2 of the pivot joint 20 is placed. Screw receptacles 50 are led into the connecting section 49. Fastening screws can be inserted through the screw receptacles 50 and screwed into corresponding threaded receptacles of the coupling piece 20.3.

The adapter 40 can be screwed to a receiving housing. The receiving housing has a housing frame 10 comprising vertical and horizontal frame profiles 11. The frame profiles 11 in the corner regions of the housing frame 10 are connected by corner connectors 13. The housing frame forms a front opening 14, which can be closed by a covering plate. Operating elements or display elements can be mounted in the covering plate. It is also possible to mount a single flat screen in the front opening. In order to fasten the front covering plate or the flat screen, a front-wall recess 11.2, which is recessed in relation to the housing front side, is incorporated into the individual frame profiles 11. Adjacent to the front-wall recess 11.2, there is a screw channel and/or detent channel 11.3. The front wall or flat screen can be affixed to this channel. The frame profiles are embodied as extruded profiles, which enclose a hollow chamber 11.1. In the vicinity of or near this hollow chamber there is a screw channel 11.5. A fastening groove 11.4 is provided to allow components to be mounted on the interior of the receiving housing. Another fastening groove 11.6 is provided on the back of the frame profiles. A captive nut can be inserted into the rear fastening groove 11.6. The captive nut is used for connecting the adapter 40. The adapter is placed with a projection 47 against a supporting section 11.8 of the upper horizontal frame profile 11. The projection 47 has one or more screw recesses 48. A fastening screw 51 can be slid through the screw recesses 48 and screwed into the captive nut contained in the fastening groove 11.6.

As shown in FIG. 2, a supporting piece 52 is connected to the projection 47. The supporting piece 52 protrudes into the interior of the receiving housing. The supporting piece 52 supports the horizontal frame profile 11 from underneath and rests against a profile inside 11.7 of the frame profile 11. Fastening receptacles 53 are led into the supporting piece 52. Fastening screws 51 can be inserted through these fastening receptacles 53 and screwed into the screw channel 11.5 of the frame profile 11.

As shown in more detail in FIG. 1, in the vicinity of or near its projection 47, the adapter 40 rests an outwardly-protruding sealing section 44. The sealing section 44 transitions flush into a sealing section 11.9 of the upper horizontal frame profile 11. A circumferential seal 45 is foamed onto the sealing section 44 of the adapter 40 and the sealing sections 11.9 of the frame profiles 11. As shown in FIG. 1, a back wall 15 can be placed in a sealed fashion against this seal 45. The back wall 15 is coupled to the lower horizontal frame profile 11 by hinges 16. The hinges 16 form a horizontal pivot axis, which allows the back wall 15 to swing closed. The back wall 15 has a cutout 18 at the edge. The edges of the cutout 18 are supported on the sections of the seal 45, which are associated with the sealing sections 44 of the adapter 40.

The cutout 18 is dimensioned so that when the adapter 40 is in place, the back wall can be swung open and closed. When closed, the back wall can be secured by locks 17. The locks 17 have a latch, which can be slid behind the sealing section 11.9 that points toward the interior of the receiving housing. In lieu of a hinge-mounted back wall 15, a back wall 15 can also be used, which is embodied as a cover. The back wall 15 can then be screw-mounted to the fastening groove 11.6 of the frame profiles 11 using the captive nuts.

What is claimed is:

1. In a supporting arm system with a supporting arm and a receiving housing, in which a pivot joint is connected to the receiving housing by an adapter and in which the supporting arm, the pivot joint, and the adapter form a cable conduit, which opens into an interior of the receiving housing, the improvement comprising: the receiving housing having a housing frame of frame profiles (11) which is closable at a back by a separate back wall (15), and the adapter (40) attached to at least one of the frame profiles (11) and having a connecting section (49) for the pivot joint (20) protruding beyond the frame profiles (11) at the back.

2. In the supporting arm system according to claim 1, wherein the connecting section (49) of the adapter (40) has a mounting surface to which the pivot joint (20) is coupled and the mounting surface is positioned parallel to an associated side of the housing and adjoins one of the coupled frame profiles (11).

3. In the supporting arm system according to claim 2, wherein the mounting surface of the adapter (40) is positioned in a plane with a profile side of one of the frame profiles (11) positioned parallel to the associated housing side.

4. In the supporting arm system according to claim 3, wherein the adapter (40) has a housing (41) in which the cable conduit is accommodated, the cable conduit is spatially connected to the interior of the receiving housing by a first cable feedthrough (46.1) and is spatially connected to the cable conduit (32) formed by the supporting arm (30) by a second cable feedthrough (46.2), the second cable feedthrough (46.2) is accommodated in the connecting section (49) of the adapter (40) protruding from the back of the housing, and in a region between the first and the second cable feedthroughs (46.1 and 46.2) the housing (41) of the adapter (40) has an inspection opening (42) which opens into the cable conduit of the adapter (40) and is closable with a cover (54).

5. In the supporting arm system according to claim 4, wherein the adapter (40) protrudes with a projection (47)

into the open back of the receiving housing, the cable conduit of the adapter (40) feeds through the projection (47) into the receiving housing, the projection (47) has a sealing section (44) which transitions into a second sealing section of the housing frame (10), the back wall (15) covering the back of the housing is attached to the housing frame (10), and the back wall (15) is supported against a seal (45) positioned between the sealing section (44) and the back wall (15).

6. In the supporting arm system according to claim 5, wherein the back wall (15) has a cutout (18), which is open toward a side of the back wall, an edge of the cutout (18) is supported by the seal (45) against the sealing section (44) of the projection (47) so that the back wall (15) is removable from the receiving housing when the adapter (40) is in place.

7. In the supporting arm system according to claim 6, wherein the adapter (40) has a supporting piece (52) which protrudes into the interior of the receiving housing and rests against an inside surface of the associated frame profile (11) and the supporting piece (52) is connected to the inside of one of the frame profiles (11).

8. In the supporting arm system according to claim 7, wherein the frame profiles (11) of the housing frame (10) each has a fastening groove (11.6) within which a back wall (15) is fastened and which covers the open back of the receiving housing, and the adapter (40) is screwed to the housing frame (10) by the fastening groove (11.6).

9. (Amended) In the supporting arm system according to claim 7, wherein the supporting piece (52) is detachably fastened to the adapter (40).

10. In the supporting arm system according to claim 9, wherein the frame profiles (11) of the housing frame (10) are embodied as lengths of extruded profile.

11. In the supporting arm system according to claim 1, wherein the adapter (40) has a housing (41) in which the cable conduit is accommodated, the cable conduit is spatially connected to the interior of the receiving housing by a first cable feedthrough (46.1) and is spatially connected to the cable conduit (32) formed by the supporting arm (30) by a second cable feedthrough (46.2), the second cable feedthrough (46.2) is accommodated in the connecting section (49) of the adapter (40) protruding from the back of the housing, and in a region between the first and the second cable feedthroughs (46.1 and 46.2) the housing (41) of the adapter (40) has an inspection opening (42) which opens into the cable conduit of the adapter (40) and is closable with a cover (54).

12. In the supporting arm system according to claim 1, wherein the adapter (40) protrudes with a projection (47) into the open back of the receiving housing, the cable conduit of the adapter (40) feeds through the projection (47) into the receiving housing, the projection (47) has a sealing section (44) which transitions into a second sealing section of the housing frame (10), the back wall (15) covering the back of the housing is attached to the housing frame (10), and the back wall (15) is supported against a seal (45) positioned between the sealing section (44) and the back wall (15).

13. In the supporting arm system according to claim 12, wherein the back wall (15) has a cutout (18), which is open toward a side of the back wall, an edge of the cutout (18) is supported by the seal (45) against the sealing section (44) of the projection (47) so that the back wall (15) is removable from the receiving housing when the adapter (40) is in place.

14. In the supporting arm system according to claim 1, wherein the adapter (40) has a supporting piece (52) which protrudes into the interior of the receiving housing and rests against an inside surface of the associated frame profile (11) and that the supporting piece (52) is connected to the inside of one of the frame profiles (11).

15. In the supporting arm system according to claim 1, wherein the frame profiles (11) of the housing frame (10) each has a fastening groove (11.6) within which a back wall (15) is fastened and which covers the open back of the receiving housing, and the adapter (40) is screwed to the housing frame (10) by the fastening groove (11.6).

16. In the supporting arm system according to claim 15, wherein a supporting piece (52) is detachably fastened to the adapter (40).

17. In the supporting arm system according to claim 1, wherein the frame profiles (11) of the housing frame (10) are embodied as lengths of extruded profile.

* * * * *